United States Patent
Yu et al.

(10) Patent No.: US 12,225,527 B2
(45) Date of Patent: Feb. 11, 2025

(54) METHOD OF PERFORMING HYBRID AUTOMATIC REPEAT REQUEST CODEBOOK GENERATION AND RELATED DEVICE

(71) Applicant: SHARP KABUSHIKI KAISHA, Sakai (JP)

(72) Inventors: Chia-Hao Yu, Taipei (TW); Chien-Chun Cheng, Taipei (TW); Wan-Chen Lin, Taipei (TW); Yu-Hsin Cheng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 389 days.

(21) Appl. No.: 17/630,005

(22) PCT Filed: Jul. 24, 2020

(86) PCT No.: PCT/CN2020/104594
§ 371 (c)(1),
(2) Date: Jan. 25, 2022

(87) PCT Pub. No.: WO2021/018051
PCT Pub. Date: Feb. 4, 2021

(65) Prior Publication Data
US 2022/0264614 A1    Aug. 18, 2022

Related U.S. Application Data

(60) Provisional application No. 62/878,755, filed on Jul. 26, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/23* (2023.01); *H04W 76/30* (2018.02)

(58) Field of Classification Search
None
See application file for complete search history.

(56) References Cited

U.S. PATENT DOCUMENTS

2017/0366305 A1  12/2017  Hwang et al.
2020/0044791 A1*  2/2020  Tsai ...................... H04L 1/1854
(Continued)

FOREIGN PATENT DOCUMENTS

| EP | 3471488 A1 | 4/2019 |
| JP | 2019510441 A | 4/2019 |
| WO | 2016/072892 A1 | 5/2016 |

OTHER PUBLICATIONS

ETRI, "UCI enhancements", 3GPP TSG RAN WG1 #97 R1-1907040, May 2019.
(Continued)

*Primary Examiner* — Srinivasa R Reddivalam
(74) *Attorney, Agent, or Firm* — ScienBiziP, P.C.

(57) ABSTRACT

A method for a user equipment (UE) for performing a hybrid automatic repeat request (HARQ) codebook generation operation for downlink transmission(s) is disclosed. The method comprises receiving, from a base station, a dynamic scheduling configuration for HARQ feedback operation; receiving, from the base station, a scheduling signaling for a first physical downlink shared channel (PDSCH) reception with a first HARQ state feedback for the first PDSCH reception being disabled; and generating, for the HARQ feedback operation, a HARQ codebook excluding a first HARQ state for the first PDSCH reception.

20 Claims, 2 Drawing Sheets

(51) Int. Cl.
*H04W 72/23* (2023.01)
*H04W 76/30* (2018.01)

(56) References Cited

U.S. PATENT DOCUMENTS

| 2020/0092869 A1* | 3/2020 | Hwang | H04L 5/0094 |
| 2021/0050948 A1* | 2/2021 | Gao | H04L 1/1812 |
| 2023/0262719 A1* | 8/2023 | Choi | H04L 1/08 370/329 |
| 2023/0345496 A1 | 10/2023 | Lee et al. | |

OTHER PUBLICATIONS

Huawei, HiSilicon, "Blind/HARQ-less Repetition for Scheduled DL-SCH Operation", 3GPP TSG RAN WG1 #93 R1-1805867, May 2018.

Nokia, Nokia Shanghai Bell, "On PDSCH enhancements for LTE URLLC", 3GPP TSG RAN WG1 #92 R1-1801866, Feb. 2018.

Lenovo, "HARQ-ACK codebook adaptation for Rel-13 eCA", 3GPP TSG-RAN WG1 #82b R1-155812, Oct. 2015.

MediaTek Inc., "Multiple HARQ procedures and intra-UE UCI prioritization", 3GPP TSG RAN WG1 #96bis R1-1904504, Apr. 2019.

3GPP TS 38.213 V16.6.0, "3rd Generation Partnership Project; Technical Specification Group Radio Access Network; NR; Physical layer procedures for control (Release 16)", Jun. 2021.

3rd Generation Partnership Project; Technical Specification Group Radio Access Network; NR; Physical layer procedures for control (Release 15); 3GPP TS 38.213 V15.6.0 (Jun. 2019).

3GPP TS 38.213, "3rd Generation Partnership Project; Technical Specification Group Radio Access Network; NR; Physical layer procedures for control (Release 15)", Technical Specification, V15.5.0 (Mar. 2019).

Nokia, Nokia Shanghai Bell, "On UL control enhancements for URLLC", R1-1802798, 3GPP TSG-RAN WG1 Meeting #92, Athens, Greece, Feb. 26-Mar. 2, 2018 (Feb. 17, 2018).

Ad-Hoc chair (Ericsson), "Chairman's notes of AI 6.2.7 Ultra Reliable Low Latency Communication for LTE", R1-1803143, 3GPP TSG-RAN WG1 Meeting #92, Athens, Greece, Feb. 26-Mar. 2, 2018 (Mar. 5, 2018).

MediaTek Inc, "Summary for more delay-tolerant re-transmission mechanisms in NR-NTN", R1-1907656, 3GPP TSG RAN WG1 Meeting #97, Reno, Nevada, USA, May 13-17, 2019 (May 16, 2019).

Huawei et al., "UCI enhancements for URLLC", R1-1906058, 3GPP TSG RAN WG1 Meeting #97, Reno, USA, May 13-17, 2019 (May 4, 2019).

MediaTek Inc., "Delay-tolerant re-transmission mechanisms in NR-NTN", R1-1906466, 3GPP TSG RAN WG1 Meeting #97, Reno, Nevada, USA, May 13-17, 2019.

Huawei, HiSilicon, "Discussion on disabling HARQ in NTN", R2-1907842, 3GPP TSG-RAN WG2 Meeting #106, Reno, USA, May 13-17, 2019.

LG Electronics Inc., "Discussion on DRX operation associated with disabling HARQ", R2-1907837, 3GPP TSG-RAN WG2 Meeting #106, Reno, USA, May 13-17, 2019.

MediaTek Inc., "Summary for more delay-tolerant re-transmission mechanisms in NR-NTN", R1-1907757, 3GPP TSG RAN WG1 Meeting #97, Reno, Nevada, USA, May 13-17, 2019.

Nomor Research GmbH et al., "HARQ Options for NTN", R2-1908247, 3GPP TSG-RAN WG2 Meeting #106, Reno, USA, May 13-17, 2019.

* cited by examiner

METHOD OF PERFORMING HYBRID AUTOMATIC REPEAT REQUEST CODEBOOK GENERATION AND RELATED DEVICE

CROSS-REFERENCE TO RELATED APPLICATION(S)

The present disclosure is the National Stage of International Patent Application No. PCT/CN2020/104594 filed on Jul. 24, 2020, entitled "METHOD OF PERFORMING HYBRID AUTOMATIC REPEAT REQUEST CODEBOOK GENERATION AND RELATED DEVICE," which claims the benefit of and priority to U.S. Provisional Patent Application Ser. No. 62/878,755 filed on Jul. 26, 2019, entitled "Dynamic Control on HARQ-less Operation for New Radio Systems". The contents of each of the aforementioned applications is hereby incorporated fully by reference into the present disclosure.

FIELD

The present disclosure generally relates to wireless communications, and more particularly, to a method of performing hybrid automatic repeat request (HARQ) codebook generation and a related device.

BACKGROUND

Non-terrestrial networks (NTN) refer to networks, or segments of networks, using an airborne or spaceborne vehicle for transmission, and was studied in 3GPP since Rel-16 timeline. Spaceborne vehicles are referred to as satellites, including Low Earth Orbiting (LEO) satellites, Medium Earth Orbiting (MEO) satellites, and Geostationary Earth Orbiting (GEO) satellites, as well as Highly Elliptical Orbiting (HEO) satellites.

According to the 3GPP Rel-16 NTN Study Item scope, evaluative works may focus on the service link (e.g., radio link between a satellite and a user equipment (UE)) design, aiming for identifying potential impacts and required enhancements on a design baseline of the terrestrial network (TN).

HARQ operation is one of the identified impacts for TN. For efficiency, a Stop-and-Wait (SAW) HARQ procedure is introduced where a set of HARQ processes can be run in parallel. SAW HARQ operation becomes challenging when round trip time (RTT) gets long since the required number of parallel HARQ processes increases linearly in order to keep physical resource occupation time higher from a UE perspective.

For services with latency requirements, the cost of HARQ retransmission may be prohibitively high if RTT delay is long. For example, the UE operating in an access network of the GEO satellite may experience a one-way propagation time up to 270 ms. With an access network of the LEO satellite with 600 km orbit, the one-way propagation delay changes continuously between 2 ms and 7 ms. The slow reaction time is expected to have performance impact on a retransmission based on a HARQ state feedback (e.g., an extra RTT delay is experienced). Thus, for latency-sensitive applications/services, a mechanism to disable the HARQ operation (or called HARQ-less operation) is provided.

HARQ-less operation may be dynamically configured according to a transmission. One HARQ state feedback opportunity in uplink (UL) may need to cover both HARQ-less transmission(s) and regular HARQ transmission(s). HARQ-less operation may exist for dynamic scheduling and SPS scheduling. However, there is no specification for HARQ codebook generation under HARQ-less operation. In addition, the number of Uplink Control Information (UCI) bits for PUCCH transmission affects PUCCH power control in certain circumstances. Since the HARQ codebook may be multiplexed in the UCI, the HARQ codebook size may affect power control as well.

SUMMARY

The present disclosure provides a method of performing HARQ codebook generation and a related device.

According to an aspect of the present disclosure, a method for a user equipment (UE) for performing a hybrid automatic repeat request (HARQ) codebook generation operation for downlink transmission(s) is provided. The method comprises receiving, from a base station, a dynamic scheduling configuration for HARQ feedback operation; receiving, from the base station, a scheduling signaling for a first physical downlink shared channel (PDSCH) reception with a first HARQ state feedback for the first PDSCH reception being disabled, and generating, for the HARQ feedback operation, a HARQ codebook excluding a first HARQ state for the first PDSCH reception.

According to another aspect of the present disclosure, a method for a base station (BS) for performing a hybrid automatic repeat request (HARQ) codebook generation operation for downlink transmission(s) is provided. The method comprises transmitting, to a user equipment (UE), a dynamic scheduling configuration for a HARQ feedback operation, transmitting, to the UE, a signaling to disable a HARQ feedback on a physical downlink shared channel (PDSCH) transmission; and not counting the PDSCH transmission in a downlink assignment index (DAI) of downlink control information (DCI) transmitted to the UE for the HARQ codebook generation.

According to another aspect of the present disclosure, a user equipment (UE) for performing a hybrid automatic repeat request (HARQ) codebook generation operation for downlink transmission(s) is provided. The UE comprises a processor for executing computer-executable instructions, and a non-transitory machine-readable medium, coupled to the processor, for storing the computer-executable instructions, wherein the computer-executable instructions instruct the processor to receive, from a base station, a dynamic scheduling configuration for HARQ feedback operation; receive, from the base station, a scheduling signaling for a first physical downlink shared channel (PDSCH) reception with a first HARQ state feedback for the first PDSCH reception being disabled; and generate, for the HARQ feedback operation, a HARQ codebook excluding a first HARQ state for the first PDSCH reception.

According to another aspect of the present disclosure, a base station (BS) for performing a hybrid automatic repeat request (HARQ) codebook generation operation for downlink transmission(s) is provided. The BS comprises a processor for executing computer-executable instructions, and a non-transitory machine-readable medium, coupled to the processor, for storing the computer-executable instructions, wherein the computer-executable instructions instruct the processor to transmit, to a user equipment (UE), a dynamic scheduling configuration for a HARQ feedback operation; transmit, to the UE, a signaling to disable a HARQ feedback on a physical downlink shared channel (PDSCH) transmission; and not counting the PDSCH transmission in a downlink assignment index (DAI) of downlink control information (DCI) transmitted to the UE for the HARQ codebook generation.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "in one embodiment", "in one implementation", "in one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on a computer readable medium, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of application-specific integrated circuitry (ASIC), programmable logic arrays, and/or using one or more digital signal processor (DSPs). Although some of the disclosed implementations are directed to software installed and executing on computer hardware, alternative implementations as firmware, as hardware, or as a combination of hardware and software are well within the scope of the present disclosure.

The computer readable medium includes, but is not limited to, random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system) typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet) via a RAN established by the BS.

It should be noted that, in the present disclosure, a UE may include, but is not limited to, a mobile station, a mobile terminal or device, a user communication radio terminal. For example, a UE may be a portable radio equipment that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), an Next Generation (NG)-eNB as in an Evolved Universal Terrestrial Radio Access (E-UTRA) BS in connection with the 5GC, a next-generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage (e.g., each cell schedules the downlink (DL) and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

HARQ operation may be disabled in either a semi-static manner or a dynamic manner. The HARQ codebook may be a semi-static codebook or a dynamic codebook.

To control HARQ operation semi-statically, a radio resource control (RRC) signaling may be used where a UE is configured to perform HARQ-less operation. During HARQ-less operation, if a transport block (TB) is to be transmitted multiple times, the retransmission decision is not based on a HARQ state feedback from intended receiver(s), where the HARQ state feedback is usually determined based on the decoding results of the TB. It is noted that the HARQ-less operation may be configured according to a UE configuration, a serving-cell (e.g., Component Carrier, CC) configuration, a BandWidth Part (BWP) configuration, or a cell group configuration. When the HARQ-less operation is configured, for example, traffic from data radio bearers (DRBs) may not be retransmitted based on a HARQ state feedback. Semi-static HARQ-less operation may be configured via semi-persistent scheduling (SPS). With SPS transmission, periodic physical resources are provided to the configured UE in a certain time duration. SPS transmission may be activated via a physical layer signaling (e.g., DCI/physical downlink control channel (PDCCH)). If one SPS transmission is activated via the physical layer signaling, some transmission parameters may be transmitted together with the activation signaling, and the transmission parameters are applicable before releasing the SPS transmission. For SPS transmission, HARQ-less operation may be configured via the RRC, or dynamically indicated in SPS activation phase. In the SPS transmission, a HARQ process number used for HARQ state feedback may not be fixed.

To control HARQ operation dynamically, physical layer signaling (e.g., DCI/PDCCH) may be used where a UE is indicated to perform HARQ-less operation for PDSCH transmission(s) corresponding to the physical layer signaling. When the HARQ-less operation is indicated via the DCI/PDCCH, certain HARQ process number(s) may be reserved by, for example, RRC configuration, to indicate HARQ-less operation for the transmission. Alternatively, a dedicated DCI field may be used to indicate HARQ-less operation of the transmission. The dedicated DCI field may be used to indicate HARQ-less operation for a UE, for a serving cell of a UE, for a BWP of a serving cell of a UE or a configured grant (CG) configuration(s), rather than the transmission.

It is noted that for HARQ-less operation, it is still possible to have blind retransmission(s) where a retransmission of a TB is blindly performed, but not based on HARQ state feedback of a previous transmission corresponding to the TB.

Figure 1:
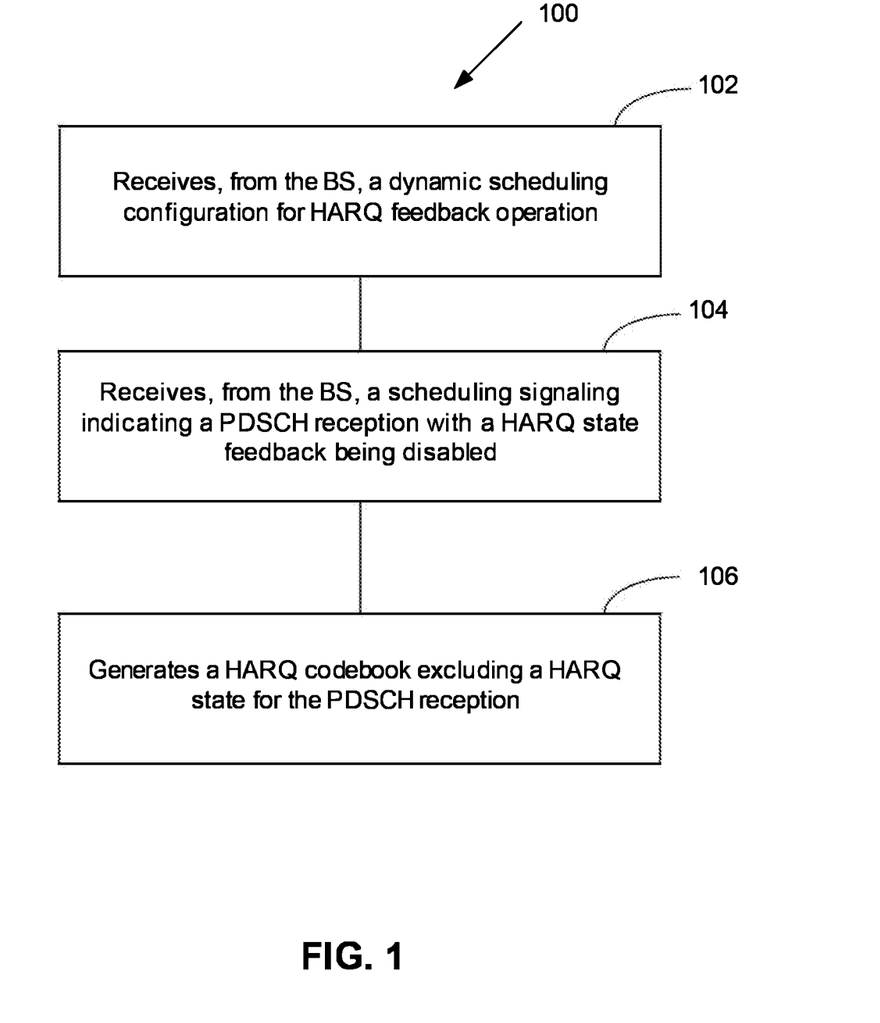
FIG. 1 is a flowchart illustrating a HARQ codebook generation operation, in accordance with example implementations of the present disclosure.

FIG. 1 illustrates a method 100 for a UE to perform a HARQ codebook generation operation. In action 102, the UE receives, from the BS, a dynamic scheduling configuration for HARQ feedback operation. In action 104, the UE receives, from the BS, a scheduling signaling indicating a PDSCH reception with a HARQ state feedback being disabled. In action 106, the UE generates a HARQ codebook excluding a HARQ state for the PDSCH reception.

The method 100 provides the HARQ codebook generation mechanism by which the UE does not include the HARQ state of the dynamic PDSCH reception whose HARQ state feedback is disabled in the HARQ codebook, but includes the HARQ states of the other dynamic PDSCH receptions whose HARQ state feedbacks are not disabled in the HARQ codebook.

In one implementation, the scheduling signaling mentioned above is downlink control information (DCI) that indicates the HARQ state feedback for the PDSCH reception being disabled.

In one implementation, the DCI includes a reserved HARQ process number for indicating the HARQ state feedback for the PDSCH reception being disabled.

In one implementation, the reserved HARQ process number may be indicated by the dynamic scheduling configuration. The dynamic scheduling configuration mentioned above may further indicate the HARQ process number(s) available for the PDSCH reception(s).

In some implementations, the UE may ignore a PDSCH-to-HARQ_feedback timing indicator in the DCI, where the PDSCH-to-HARQ_feedback timing indicator indicates a time gap between the PDSCH reception where the HARQ state feedback is disabled and the corresponding feedback timing of the HARQ state for the PDSCH reception.

Moreover, the UE may be configured with SPS PDSCH reception. In this case, the UE receives, from the BS, a SPS configuration for an SPS PDSCH reception, where the SPS configuration indicates that a HARQ state feedback for the SPS PDSCH reception is disabled. For HARQ operation, the UE generates the HARQ codebook excluding the HARQ state of the SPS PDSCH reception. However, in some examples, the UE may include a HARQ state for an SPS activation signaling or an SPS release signaling corresponding to an SPS PDSCH reception in the HARQ codebook.

In some implementations, the UE may multiplex the HARQ codebook in UCI on a PUCCH transmission, for transmitting the HARQ codebook to the BS. The UE may determine a power control parameter for the PUCCH transmission according to at least one of a downlink assignment index (DAI) value of the DCI scheduling a PDSCH reception, an actual number of PDCCH receptions excluding a PDCCH reception which indicates a PDSCH reception with HARQ state feedback being disabled, and a number of received TBs excluding a TB(s) associated with the HARQ-less operation. The DAI value above may not count the reception of PDCCH(s) corresponding to PDSCH(s) being indicated to follow HARQ-less operation.

In some implementations, the UE may multiplex the HARQ codebook in UCI on a physical uplink shared channel (PUSCH) transmission, for transmitting the HARQ codebook to the BS. In one example, the UE may receive, from the BS, only the PDSCH reception or the SPS PDSCH reception with corresponding HARQ state feedback being disabled, and receive, from the BS, a DAI with a predetermined value, wherein the DAI is received from DCI scheduling the PUSCH transmission.

On the other hand, the BS may transmit, to the UE, the dynamic scheduling configuration mentioned above, and transmit, to the UE, a signaling to disable the HARQ state feedback on a PDSCH reception (referred to as a HARQ-less PDSCH reception). For HARQ codebook generation, the BS may not count the HARQ-less PDSCH transmission in a DAI of the DCI transmitted to the UE.

Dynamic HARQ codebook generation and semi-static HARQ codebook generation are disclosed.

In a first method of generating dynamic HARQ codebook, when at least one PDSCH reception whose HARQ state feedback is disabled (hereafter called HARQ-less PDSCH reception), an "ACK" state is always reported for the HARQ-less PDSCH reception irrespective of the decoding results of the HARQ-less PDSCH reception. For an activation or release PDCCH associated a HARQ-less SPS PDSCH reception, a HARQ state of the HARQ-less PDSCH reception may or may not follow the principle defined in NR Rel-15/16, for example, as in the TS 38.213 V15.5.0 technical document. If the UE is conformed to the principle of NR Rel-15/16, the UE may report the HARQ state for the HARQ-less SPS PDSCH reception according to decoding results of the HARQ-less SPS PDSCH reception, to generate the dynamic HARQ codebook. If the UE is not conformed to the principle of NR Rel-15/16 as in TS 38.213 V15.5.0 for NTN scenarios addressed here, the UE may report the "ACK" state for the HARQ-less SPS PDSCH reception irrespective of the decoding results of the HARQ-less PDSCH reception.

In some implementations, all HARQ states of the HARQ-less PDSCH receptions are constrained to the "ACK" state. In this case, the generated dynamic HARQ codebook size is the same as those in NR Rel-15/16, irrespective of the HARQ-less operation or regular HARQ operation.

For a PDCCH associated with SPS PDSCH activation or release, the UE may report HARQ state of a corresponding HARQ-less PDSCH reception to the BS according to the decoding results of the corresponding HARQ-less PDSCH reception.

In some implementations, the UE may report the "ACK" state for a HARQ-less SPS PDSCH reception to the BS as long as the PDCCH associated with the SPS PDSCH activation or release passes a cyclic redundancy check (CRC) check.

In a second method, a HARQ state of a HARQ-less PDSCH reception is excluded from the dynamic HARQ codebook, irrespective of the decoding results of the HARQ-less PDSCH reception. For an activation or release PDCCH associated with a SPS HARQ-less PDSCH reception, the HARQ state of the SPS HARQ-less PDSCH reception may or may not be included in the dynamic HARQ codebook.

In one implementation, an SPS PDSCH reception corresponding to an SPS configuration may be indicated as HARQ-less SPS PDSCH reception. When the SPS PDSCH reception for which the HARQ state feedback is disabled, the UE excludes the HARQ state of the SPS PDSCH reception from the dynamic HARQ codebook.

For an activation or release PDCCH, that is, a PDCCH associated with SPS PDSCH activation or release, corresponding to a HARQ-less SPS PDSCH reception, the UE may report the HARQ state of the HARQ-less SPS PDSCH reception according to the decoding results of corresponding HARQ-less SPS PDSCH reception as detailed in NR Rel-15/16, for example, in the TS 38.213 V15.5.0 technical document. That is, a HARQ state of the HARQ-less SPS PDSCH reception is included in the dynamic HARQ codebook. In one example, the HARQ state (e.g., "ACK" or "NACK" state) is determined based on if an activation or release PDCCH corresponding to a HARQ-less SPS PDSCH reception passes CRC check or not. If a CRC check is passed, "ACK" for the HARQ-less SPS PDSCH reception may be reported. If a CRC check fails, "NACK" may be reported.

In some implementations, the UE may exclude the HARQ state of a HARQ-less SPS PDSCH reception from the dynamic HARQ codebook.

Under the principle of the second method, a downlink assignment index (DAI) field may not count a PDCCH reception that schedules a PDSCH reception or HARQ-less SPS PDSCH activation or release.

The DAI field may correspond to the DCI format 1_0 or 1_1, and is indicated as a counter DAI. In one example, the DAI field is indicated as a counter DAI if there is only one serving cell configured to a UE. In other examples, the DAI field includes a counter DAI (for example, 2 MSB bits) and a total DAI (for example, 2 LSB bits) if there is more than one serving cell configured to a UE.

When an SPS PDSCH reception is indicated as a HARQ-less SPS PDSCH reception, the HARQ-less SPS PDSCH reception may be excluded from DAI field counting.

In one implementation, the DAI field counts an activation or release PDCCH reception corresponding to a HARQ-less SPS PDSCH.

In some implementations, the DAI field does not count an activation or release PDCCH reception corresponding to a HARQ-less SPS PDSCH.

When not counting or excluding the activation or release PDCCH for HARQ-less SPS PDSCH, the value of the DAI field in corresponding DCI may be ignored by the UE. The value of the DAI field in the corresponding DCI may be managed by the BS. The UE may use the value of the DAI field for deriving a number of PDSCH receptions with regular HARQ operation.

Moreover, the UE may multiplex the dynamic HARQ codebook in the UCI on PUSCH, and if only one PDSCH reception with HARQ-less operation is received by the UE, the UL DAI (e.g., $V_{T-DAI}^{UL}$) field in the corresponding DCI format 0_1 may be indicated by a fixed value, for example, '4'.

For either the first or the second method mentioned above, when the number of bits of the UCI (e.g., $O_{ACK}+O_{SR}+O_{CSI}$) is smaller or equal to a predetermined threshold (e.g., 11 bits), where $O_{ACK}$: the number of HARQ information bits of the dynamic HARQ codebook to be included in the UCI, $O_{SR}$: the number of scheduling request (SR) bits to be included in the UCI, and $O_{CSI}$: the number of CSI (channel state information) bits to be included in the UCI, a number of HARQ information bits (e.g., $n_{HARQ-ACK}$), which is used for obtaining a transmission power for a PUCCH that carries the UCI, is determined based on a predefined rule.

The use of the number of the $n_{HARQ-ACK}$ for obtaining the transmission power of the PUCCH may follow those as described in NR Rel-15/16 (e.g., in the 3GPP TS 38.213 V15.5.0 technical document). The predefined rule differentiates itself between two cases: (1) all serving cells follow non-code block group based (non-CBG-based) HARQ operation; (2) a subset of serving cells is configured for CBG-based HARQ operation. Two cases are disclosed.

Case 1: Non-CBG-Based HARQ Operation for all Serving Cells

If none of the serving cells is configured to perform CBG-based HARQ operation, the value of $n_{HARQ-ACK}$ may be determined based on Eq. 1. It is noted that Eq. 1 follows the formulation in NR Rel-15/16, for example, TS 38.213 V15.5.0, but with the definition of the parameters modified as detailed below.

$$n_{HARQ-ACK} = \quad \text{Eq. 1}$$

$$n_{HARQ-ACK,TB} = \left( \left( V_{DAI,M_{last}}^{DL} - \sum_{c=0}^{N_{cells}^{DL}-1} U_{DAI,c} \right) \bmod 4 \right) N_{TB,max}^{DL} + \sum_{c=0}^{N_{cells}^{DL}-1} \left( \sum_{m=0}^{M-1} N_{m,c}^{received} + N_{SPS,c} \right);$$

where $N_{cells}^{DL}$ is the number of serving cells configured by higher layers for the UE, M is the cardinality of a set of PDCCH monitoring occasions for a PDCCH with the DCI format 1_0 or DCI format 1_1 for scheduling PDSCH receptions or SPS PDSCH release across active DL BWPs of configured serving cells for which the UE transmits the dynamic HARQ codebook in a same PUCCH in slot n where all receptions are configured/indicated with regular HARQ operation. The PDCCH monitoring occasions are in ascending order of start time of the search space sets associated with a PDCCH monitoring occasion. Based on the description above, in one implementation, if a transmission is indicated/configured as HARQ-less transmission, the corresponding transmitted TB(s) is not considered in Eq. 1.

If $N_{cells}^{DL}=1$, $V_{DAI,M_{last}}^{DL}$ is the value of the counter DAI in the last valid DCI format 1_0 or DCI format 1_1 scheduling PDSCH reception or indicating SPS PDSCH release for any serving cell c that the UE detects within the M PDCCH monitoring occasions.

If $N_{cells}^{DL}>1$, there are two scenarios for determining $V_{DAI,M_{last}}^{DL}$.

If the UE does not detect any valid DCI format 1_1 in a last PDCCH monitoring occasion within the M PDCCH monitoring occasions where the UE detects at least one DCI format scheduling PDSCH reception or indicating SPS PDSCH release for any serving cell c, $V_{DAI,M_{last}}^{DL}$ is the value of the counter DAI in a last valid DCI format 1_0 that the UE detects in the last PDCCH monitoring occasion.

If the UE detects at least one valid DCI format 1_1 in a last PDCCH monitoring occasion within the M PDCCH monitoring occasions where the UE detects at least one DCI format scheduling PDSCH reception or indicating SPS PDSCH release for any serving cell c, $V_{DAI,M_{last}}^{DL}$ is the value of the total DAI in the at least one valid DCI format 1_1.

If $V_{DAI,M_{last}}^{DL}=0$, the UE does not detect any valid DCI format 1_0 or DCI format 1_1 scheduling PDSCH reception or indicating SPS PDSCH release for any serving cell c in any of the M PDCCH monitoring occasions.

$U_{DAI,c}$ is the total number of valid DCI format 1_0 and DCI format 1_1 scheduling PDSCH receptions or indicating SPS PDSCH release that the UE detects within the M PDCCH monitoring occasions for serving cell c. If $U_{DAI,c}=0$, the UE does not detect any valid DCI format 1_0 or DCI format 1_1 scheduling PDSCH reception or indicating SPS PDSCH release for serving cell c in any of the M PDCCH monitoring occasions.

$N_{TB,max}^{DL}=2$, a value of "maxNrofCodeWordsScheduledByDCI" provided from higher layers is '2' for any serving cell c and "harq-ACK-SpatialBundlingPUCCH" is not provided; otherwise, $N_{TB,max}^{DL}=1$.

$N_{m,c}^{received}$ is the number of transport blocks the UE receives in a PDSCH scheduled by valid DCI format 1_0 or DCI format 1_1 that the UE detects in PDCCH monitoring occasion m for serving cell c if "harq-ACK-SpatialBundlingPUCCH" is not provided, or the number of PDSCH scheduled by valid DCI format 1_0 and DCI format 1_1 that the UE detects in PDCCH monitoring occasion m for serving cell c if "harq-ACK-SpatialBundlingPUCCH" is provided, or the number of valid DCI format 1_0 that the UE detects and indicate SPS PDSCH release in PDCCH monitoring occasion m for serving cell c.

In one example, the UE may expect "harq-ACK-SpatialBundlingPUCCH" to be provided if the first method mentioned above is used. For example, when the UE is indicated to feedback "ACK" states for HARQ-less PDSCH receptions, the UE is configured with "harq-ACKSpatialbundlingPUCCH".

$N_{SPS,c}$ is the number of SPS PDSCH receptions by the UE on serving cell c for which the UE transmits a corresponding dynamic HARQ codebook in the same PUCCH as for a dynamic HARQ codebook corresponding to PDSCH receptions within the M PDCCH monitoring occasions. In one example, if a SPS configuration corresponding to the SPS PDSCH receptions is configured with HARQ-less operation, the UE does not include the SPS PDSCH receptions when counting $N_{SPS,c}$. It is noted that a SPS PDSCH reception associated with an SPS PDSCH activation may or may not be counted in $N_{SPS,c}$, dependent on implementations of the second method mentioned above.

In one implementation, the valid DCI may be any DCI, irrespective of whether it indicates HARQ-less operation or regular HARQ operation for a PDSCH reception. For example, all received DCIs are valid DCIs.

In other implementations, the valid DCI may be the DCI that does not indicate HARQ-less PDSCH reception. In one example, the received DCIs are valid only if they are associated with PDSCH receptions with regular HARQ operation. In other words, the received DCIs are invalid if their associated PDSCH transmissions are configured with (or, indicated as) HARQ-less operation. In another example, the DCI associated with SPS PDSCH activation may or may not be valid DCI, dependent on implementations of the second method. In other examples, the DCI associated with SPS PDSCH release may or may not be valid DCI, dependent on implementations of the second method.

Case 2: CBG-Based HARQ Operation for a Subset of Serving Cells

In this case, a UE is configured with the CBG-based transmission (e.g., via higher layer parameter PDSCH-CodeBlockGroupTransmission) for $N_{cells}^{DL,CBG}$ serving cells, and is not provided CBG-based transmission for $N_{cells}^{DL,TB}$ serving cells, where $N_{cells}^{DL,TB} + N_{cells}^{DL,CBG} = N_{cells}^{DL}$.

For obtaining a PUCCH transmission power, the UE determines $n_{HARQ-ACK} = n_{HARQ-ACK,TB} + n_{HARQ-ACK,CBG}$, where $n_{HARQ-ACK,CBG}$ is determined based on Eq. 2, and $n_{HARQ-ACK,TB}$ is determined based on Eq. 1. It is noted that Eq. 2 follows the formulation in NR Rel-15/16, for example, TS 38.213 V15.5.0, but with the definition of the parameters modified as detailed below. It is also noted that the same notation from Eq. 1 has the same definition here. Particularly, a monitoring occasion may be counted in Eq. 2 when it relates to regular HARQ operation. If a transmission is indicated/configured as HARQ-less transmission, the corresponding transmitted TB(s) is not considered in Eq. 1.

$$n_{HARQ-ACK,CBG} = \quad \text{Eq. 2}$$

$$\left(\left(V_{DAI,M_{last}}^{DL} - \sum_{k=0}^{N_{cells}^{DL,CBG}-1} U_{DAI,c}^{CBG}\right)\bmod 4\right) N_{HARQ,max}^{CBG/TB,max} +$$

$$\sum_{k=0}^{N_{cells}^{DL}-1}\left(\sum_{m=0}^{M-1} N_{m,c}^{received,CBG}\right).$$

If $N_{cells}^{DL}=$, $V_{DAI,M_{last}}^{DL}$ is the value of the counter DAI in the last valid DCI format 1_1 scheduling CBG-based PDSCH reception for any serving cell c that the UE detects within the M PDCCH monitoring occasions.

If $N_{cells}^{DL}>1$, $V_{DAI,M_{last}}^{DL}$ is the value of the total DAI in the last valid DCI format 1_1 scheduling CBG-based PDSCH reception for any serving cell c that the UE detects within the M PDCCH monitoring occasions.

If $V_{DAI,M_{last}}^{DL}=0$, the UE does not detect any valid DCI format 1_1 scheduling CBG-based PDSCH reception for any serving cell c in any of the M PDCCH monitoring occasions.

$U_{DAI,c}^{CBG}$ is the total number of valid DCI format 1_1 scheduling CBG-based PDSCH receptions that the UE detects within the M PDCCH monitoring occasions for serving cell c. If $U_{DAI,c}^{CBG}=0$, the UE does not detect any valid DCI format 1_1 scheduling CBG-based PDSCH reception for serving cell c in any of the M PDCCH monitoring occasions.

$N_{m,c}^{received,CBG}$ is the number of CBGs the UE receives in a PDSCH scheduled by valid DCI format 1_1 that the UE detects in PDCCH monitoring occasion m for serving cell c and the UE reports corresponding dynamic HARQ codebook in the PUCCH.

In one implementation, the valid DCI may be any DCI, irrespective of whether it indicates HARQ-less operation or regular HARQ operation for a PDSCH reception. For example, all received DCIs are valid DCIs.

In other implementations, the valid DCI may be the DCI that does not indicate HARQ-less PDSCH reception. In one example, the received DCIs are valid only if they are associated with PDSCH receptions with regular HARQ operation. In other words, the received DCIs are invalid if their associated PDSCH transmissions are configured with HARQ-less operation. In another example, the DCI associated with SPS PDSCH activation may or may not be valid DCI, dependent on implementations of the second method. In other examples, the DCI associated with SPS PDSCH release may or may not be valid DCI, dependent on implementations of the second method.

It is noted that CBG-based HARQ operation may be only conditionally configured based on configuration for HARQ-less PDSCH receptions. For example, the UE expects only non-CBG-based HARQ operation if the first method is used. That is, when the UE is indicated to feedback "ACK" states for HARQ-less PDSCH receptions, the UE does not expect CBG-based HARQ operation to be configured.

For a semi-static HARQ codebook, with a PDSCH reception indicated as HARQ-less operation via a physical layer signaling, the PDSCH reception may not need to have a corresponding HARQ state bit in the semi-static HARQ codebook.

Three methods for generating the semi-static HARQ codebook are disclosed.

Method 1: A semi-static HARQ codebook does not support per-transmission indication of a HARQ-less operation. In one example, if a HARQ codebook is configured as a semi-static HARQ codebook and the UE receives the HARQ-less PDSCH reception via DCI or Media Access Control (MAC) Control Element (CE), the UE may automatically change the semi-static HARQ codebook to the dynamic HARQ codebook. In another example, if a HARQ codebook is configured as a semi-static HARQ codebook and UE receives the HARQ-less PDSCH reception via DCI or a MAC CE, the UE may determine the received HARQ-less PDSCH reception as being a kind of error and ignore it (e.g., continuously apply the semi-static HARQ codebook).

Method 2: "ACK" state is reported for a HARQ-less PDSCH reception. That is, a HARQ state (e.g., ACK/NACK) of the HARQ-less PDSCH reception does not depend on decoding results of the corresponding PDSCH reception. In this case, HARQ state bits for the HARQ-less PDSCH receptions are included in the semi-static HARQ codebook.

In other examples, in the semi-static HARQ codebook, HARQ states of the HARQ-less PDSCH receptions are conformed to the regular HARQ operation as defined in, for example, 3GPP TS 38.213 V15.5.0.

Method 3: A HARQ-less PDSCH reception is excluded from the semi-static HARQ codebook.

In one example, in the semi-static HARQ codebook, a HARQ state bit of the HARQ-less PDSCH reception may be excluded based on a "PDSCH-to-HARQ_feedback timing indicator" field in corresponding DCI.

Figure 2:
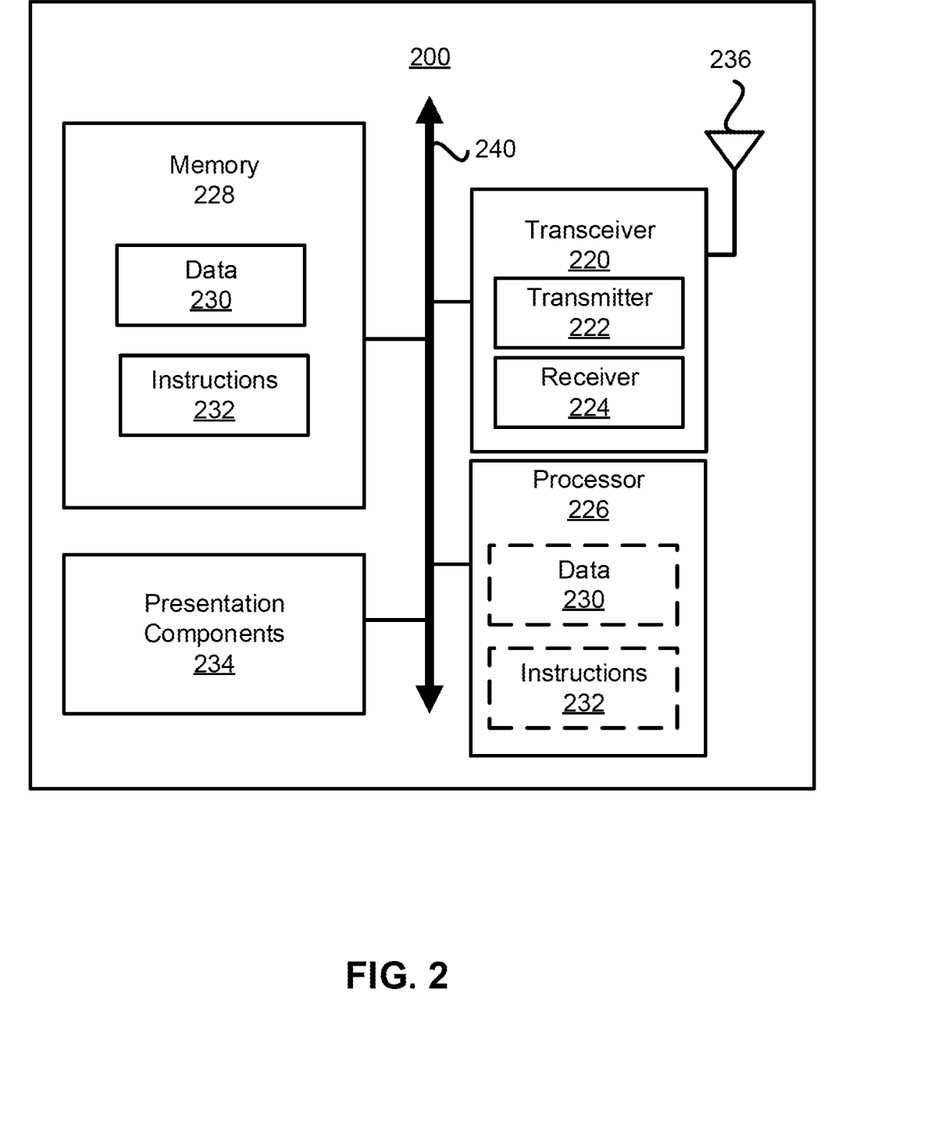
FIG. 2 is a block diagram illustrating a node for wireless communication, in accordance with example implementations of the present disclosure.

FIG. 2 illustrates a node 200 for wireless communication according to the present disclosure.

As illustrated in FIG. 2, the node 200 may include a transceiver 220, a processor 226, memory 228, one or more presentation components 234, and at least one antenna 236. The node 200 may also include a Radio Frequency (RF) spectrum band module, a BS communications module, a network communications module, and a system communications management module, input/output (I/O) ports, I/O components, and a power supply (not shown). Each of these components may be in communication with each other, directly or indirectly, over one or more buses 240. The node 200 may be a UE that performs various disclosed functions as illustrated in FIG. 1.

The transceiver 220 includes a transmitter 222 (with transmitting circuitry) and a receiver 224 (with receiving circuitry) and may be configured to transmit and/or receive time and/or frequency resource partitioning information. The transceiver 220 may be configured to transmit in different types of subframes and slots including, but not limited to, usable, non-usable and flexibly usable subframes and slot formats. The transceiver 220 may be configured to receive data and control channels.

The node 200 may include a variety of computer-readable media. Computer-readable media may be any media that can be accessed by the node 200 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 228 may include computer-storage media in the form of volatile and/or non-volatile memory. The memory 228 may be removable, non-removable, or a combination thereof. Memory includes solid-state memory, hard drives, and optical-disc drives. As illustrated in FIG. 2, the memory 228 may store computer-readable, computer-executable instructions 232 (e.g., software codes) that are configured to cause the processor 226 (e.g., processing circuitry) to perform various disclosed functions. Alternatively, the instructions 232 may be configured to cause the node 200 (e.g., when compiled and executed) to perform various disclosed functions.

The processor 226 may include an intelligent hardware device (e.g., a central processing unit (CPU), a microcontroller, an Application Specific Integrated Circuit (ASIC), etc.). The processor 226 may include memory. The processor 226 may process the data 230 and the instructions 232 received from the memory 228, and information received via the transceiver 220, the baseband communications module, and/or the network communications module. The processor 226 may also process information to be sent to the transceiver 220 for transmission via the antenna 236, to the network communications module for transmission to a CN.

One or more presentation components 234 present data to a person or other device. Presentation components 234 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) for performing a hybrid automatic repeat request (HARQ) codebook generation operation for downlink receptions, the method comprising:
receiving, from a base station, a dynamic scheduling configuration for a HARQ feedback operation;
receiving, from the base station, scheduling signaling for a first physical downlink shared channel (PDSCH) reception to disable a first HARQ state feedback for the first PDSCH reception; and
generating, for the HARQ feedback operation, a HARQ codebook that excludes a first HARQ state for the first PDSCH reception, wherein the HARQ codebook is generated without counting a first physical downlink control channel (PDCCH) reception in a downlink assignment index (DAI) value indicated in the scheduling signaling.

2. The method of claim 1, wherein the scheduling signaling comprises first downlink control information (DCI) and the first DCI indicates the first HARQ state feedback to be disabled.

3. The method of claim 1, further comprising:
receiving, from the base station, a semi-persistent scheduling (SPS) configuration for an SPS PDSCH reception, wherein the SPS configuration indicates disabling a second HARQ state feedback for the SPS PDSCH reception; and
excluding a second HARQ state for the SPS PDSCH reception from the HARQ codebook.

4. The method of claim 3, further comprising:
including a third HARQ state for at least one of SPS activation signaling and SPS release signaling corresponding to the SPS PDSCH reception in the HARQ codebook.

5. The method of claim 3, further comprising:
multiplexing the HARQ codebook in uplink control information (UCI) on a physical uplink control channel (PUCCH) transmission; and
determining a power control parameter for the PUCCH transmission according to at least one of a second DAI value of second DCI which schedules a second PDSCH reception, an actual number of PDCCH receptions excluding the first PDCCH reception which indicates the first PDSCH reception, a number of received transport blocks (TBs) excluding one or more first TBs associated with the first HARQ state, and a number of received TBs excluding one or more second TBs associated with the second HARQ state.

6. The method of claim 5, wherein the second DAI value does not increment by the first PDCCH reception.

7. The method of claim 3, further comprising:
multiplexing the HARQ codebook in uplink control information (UCI) on a physical uplink shared channel (PUSCH) transmission;
receiving, from the base station, the first PDSCH reception or the SPS PDSCH reception with a corresponding HARQ state feedback being disabled; and
receiving, from the base station, a DAI with a predetermined value, wherein the DAI is received via third DCI scheduling the PUSCH transmission.

8. The method of claim 2, wherein the first DCI includes a reserved HARQ process number for indicating the first HARQ state feedback to be disabled.

9. The method of claim 8, wherein the reserved HARQ process number is indicated by the dynamic scheduling configuration.

10. The method of claim 2, further comprising:
ignoring a PDSCH-to-HARQ feedback timing indicator in the first DCI, wherein the PDSCH-to-HARQ feedback timing indicator indicates a time between the first PDSCH reception where the first HARQ state feedback is disabled and a corresponding feedback timing of the first HARQ state.

11. A method for a base station (BS) for performing a hybrid automatic repeat request (HARQ) codebook generation operation for downlink transmissions, the method comprising:
transmitting, to a user equipment (UE), a dynamic scheduling configuration for a HARQ feedback operation;

transmitting, to the UE, scheduling signaling for a physical downlink shared channel (PDSCH) transmission to disable a HARQ state feedback for the PDSCH transmission; and receiving, from the UE, a HARQ codebook, wherein the HARQ codebook excludes a HARQ state for the PDSCH transmission and is generated without counting a physical downlink control channel (PDCCH) transmission in a downlink assignment index (DAI) value indicated in the scheduling signaling.

12. A user equipment (UE) for performing a hybrid automatic repeat request (HARQ) codebook generation operation for downlink receptions, the UE comprising:
   at least one processor; and
   at least one non-transitory computer-readable medium coupled to the at least one processor and storing one or more computer-executable instructions that, when executed by the at least one processor, cause the UE to:
     receive, from a base station, a dynamic scheduling configuration for a HARQ feedback operation;
     receive, from the base station, scheduling signaling for a first physical downlink shared channel (PDSCH) reception to disable a first HARQ state feedback for the first PDSCH reception; and
     generate, for the HARQ feedback operation, a HARQ codebook that excludes a first HARQ state for the first PDSCH reception, wherein the HARQ codebook is generated without counting a first physical downlink control channel (PDCCH) reception in a downlink assignment index (DAI) value indicated in the scheduling signaling.

13. The UE of claim 12, wherein the scheduling signaling comprises first downlink control information (DCI) and the first DCI indicates the first HARQ state feedback to be disabled.

14. The UE of claim 12, wherein the one or more computer-executable instructions, when executed by the at least one processor, further cause the UE to:
   receive, from the base station, a semi-persistent scheduling (SPS) configuration for an SPS PDSCH reception, wherein the SPS configuration indicates disabling a second HARQ state feedback for the SPS PDSCH reception; and
   exclude a second HARQ state for the SPS PDSCH reception from the HARQ codebook.

15. The UE of claim 14, wherein the one or more computer-executable instructions, when executed by the at least one processor, further cause the UE to:
   include a third HARQ state for at least one of SPS activation signaling and SPS release signaling corresponding to the SPS PDSCH reception in the HARQ codebook.

16. The UE of claim 14, wherein the one or more computer-executable instructions, when executed by the at least one processor, further cause the UE to:

multiplex the HARQ codebook in uplink control information (UCI) on a physical uplink control channel (PUCCH) transmission; and determine a power control parameter for the PUCCH transmission according to at least one of a second DAI value of second DCI which schedules a second PDSCH reception, an actual number of PDCCH receptions excluding the first PDCCH reception which indicates the first PDSCH reception, a number of received transport blocks (TBs) excluding one or more first TBs associated with the first HARQ state, and a number of received TBs excluding one or more second TBs associated with the second HARQ state.

17. The UE of claim 14, wherein the one or more computer-executable instructions, when executed by the at least one processor, further cause the UE to:
   multiplex the HARQ codebook in uplink control information (UCI) on a physical uplink shared channel (PUSCH) transmission;
   receive, from the base station, the first PDSCH reception or the SPS PDSCH reception with a corresponding HARQ state feedback being disabled; and
   receive, from the base station, a DAI with a predetermined value, wherein the DAI is received from third DCI scheduling the PUSCH transmission.

18. The UE of claim 13, wherein the first DCI includes a reserved HARQ process number for indicating the first HARQ state feedback to be disabled.

19. The UE of claim 18, wherein the reserved HARQ process number is indicated by the dynamic scheduling configuration.

20. A base station (BS) for performing a hybrid automatic repeat request (HARQ) codebook generation operation for downlink transmissions, the BS comprising:
   at least one processor; and
   at least one non-transitory computer-readable medium coupled to the at least one processor and storing one or more computer-executable instructions that, when executed by the at least one processor, cause the BS to:
     transmit, to a user equipment (UE), a dynamic scheduling configuration for a HARQ feedback operation;
     transmit, to the UE, scheduling signaling for a physical downlink shared channel (PDSCH) transmission to disable a HARQ state feedback for the PDSCH transmission; and
     receive, from the UE, a HARQ codebook, wherein
     the HARQ codebook excludes a HARQ state for the PDSCH transmission and is generated without counting a physical downlink control channel (PDCCH) transmission in a downlink assignment index (DAI) value indicated in the scheduling signaling.

* * * * *